United States Patent
Gandy

Patent Number: 6,141,352
Date of Patent: Oct. 31, 2000

[54] METHOD AND APPARATUS FOR TRANSMITTING 10BASE-T SIGNALS ACROSS A 100BASE-X PHYSICAL LAYER DEVICE SERVICE INTERFACE

[75] Inventor: Thomas W. Gandy, Palo Alto, Calif.

[73] Assignee: Nortel Networks Limited, Montreal, Canada

[21] Appl. No.: 08/949,077

[22] Filed: Oct. 10, 1997

[51] Int. Cl.[7] .............................. H04L 12/66; H03M 7/34; H03M 1/00; H04J 3/16

[52] U.S. Cl. .............................. 370/463; 370/465; 341/51; 341/110

[58] Field of Search ................................ 370/463, 465, 370/438, 501; 375/361; 341/110, 70, 51, 69, 61, 173, 60; 709/250

[56] References Cited

U.S. PATENT DOCUMENTS

| | | | |
|---|---|---|---|
| 5,577,069 | 11/1996 | Lau et al. | 375/242 |
| 5,754,540 | 5/1998 | Liu et al. | 370/315 |
| 5,852,609 | 12/1998 | Adams, III et al. | 370/465 |
| 5,896,417 | 4/1999 | Lau | 375/258 |
| 5,907,553 | 5/1999 | Kelly et al. | 370/433 |
| 5,923,663 | 7/1999 | Bontemps et al. | 370/445 |

OTHER PUBLICATIONS

"AM/79865/AM79866A Physical Data Transmitter/Physical Data Receiver," Advanced Micro Devices White Paper, Publication #15451, Rev: D, Issue Date: Jun. 1996, 17 pages.

Primary Examiner—Alpus H. Hsu
Assistant Examiner—Duc Ho
Attorney, Agent, or Firm—Blakely Sokoloff Taylor & Zafman LLP

[57] ABSTRACT

A method and apparatus for transmitting waveshape information compatible with IEEE 802.3, 10BASE-T, Ethernet LAN standards across a service interface commercially implemented in a single speed, physical layer device compatible with IEEE 802.3, and 100BASE-X Ethernet LAN standards. The method and apparatus provide support for dual speed, 10/100 Mb/s physical layer devices. The coding of the 10BASE-T information across the physical layer device service interface is based on the observation that all legitimate 10BASE-T waveforms on the medium can be represented by a small group of edge shapes clocked at 20 MHz. This alternate, compact coding of 10BASE-T information is mapped over a service interface implementation which can alternately carry 100BASE-X code-bit information to provide dual speed, 10/100 Mb/s IEEE standards compliant performance, but does not necessarily adhere to the architectural boundaries and signaling primitives defined in the IEEE 802.3 standard.

28 Claims, 5 Drawing Sheets

METHOD AND APPARATUS FOR TRANSMITTING 10BASE-T SIGNALS ACROSS A 100BASE-X PHYSICAL LAYER DEVICE SERVICE INTERFACE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of baseband computer networks. Specifically, the present invention relates to a method and apparatus utilized by a dual speed 10/100 Mb/s physical layer device. The dual speed device provides support for transmitting waveshape information compatible with the Institute of Electrical and Electronic Engineers (IEEE) 802.3 Clause 14, 10 million bits per second (10 Mb/s) Physical Layer specification, i.e., IEEE 802.3 Standard 10BASE-T Ethernet, over a service interface in the physical layer. The interface, although not specified in IEEE 802.3, is commonly used in the single speed implementation of 100 million bits per second (100 Mb/s) Local Area Network (LAN) physical layer devices compatible with the Physical Layer specifications defined in the IEEE 802.3u Supplement (excepting Clause 23 and 26), i.e., the IEEE 802.3 Standard 100BASE-TX Ethernet.

2. Description of the Related Art

Overview of 100 Mb/s Baseband Networks

Figure 1:
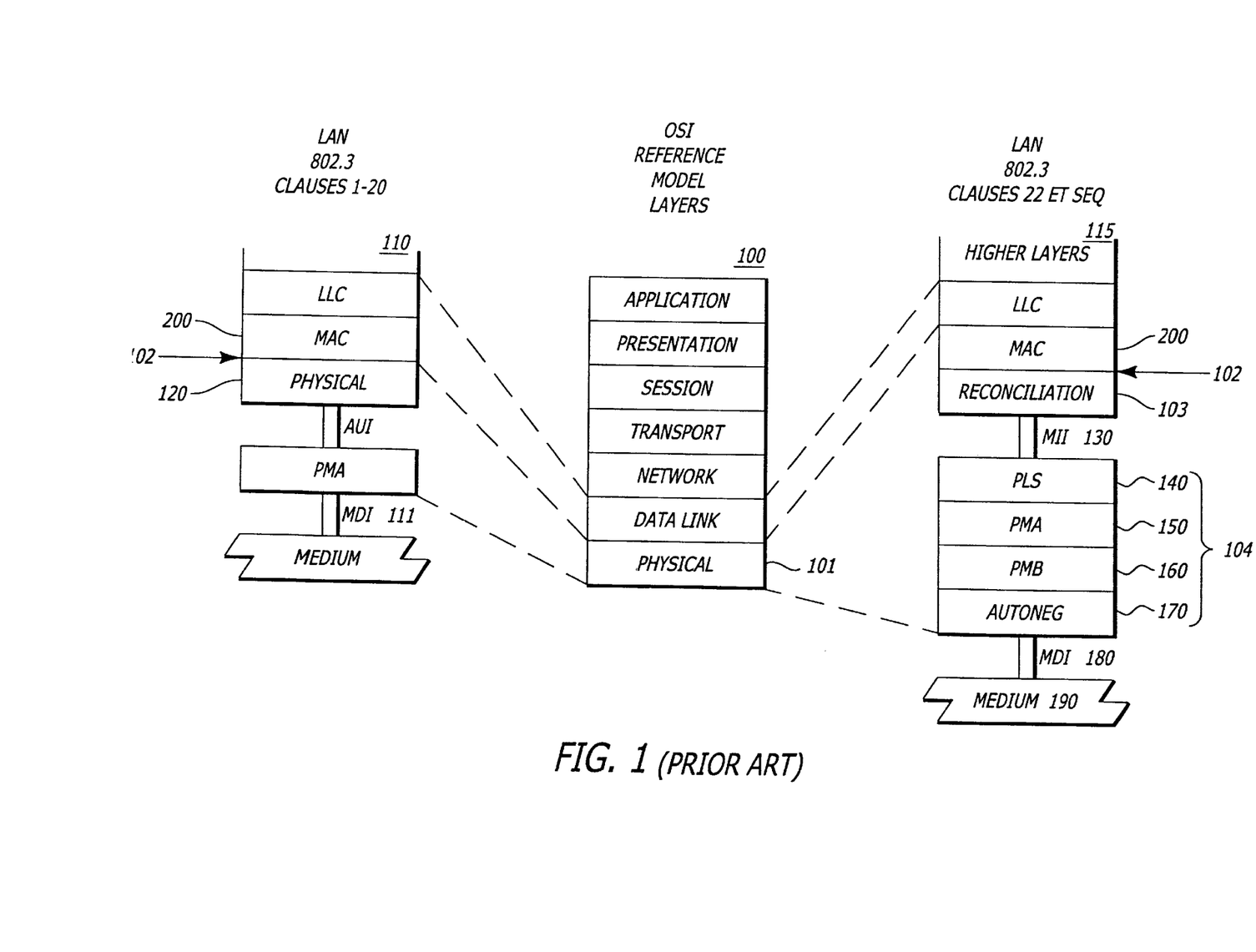
FIG. 1 illustrates a comparison of the OSI 7-layer abstract reference model to the IEEE 802.3 architecture layers for 1 Mb/s through 10 Mb/s and 100 Mb/s.

To better appreciate and understand the present invention, a brief overview of relevant aspects of 100 Mb/s baseband local area networks follows. The operation of a Local Area Network (LAN) is often described in terms of the International Standards Organization (ISO) seven-layer Open Systems Interconnection (OSI) abstract reference model. Referring to FIG. 1, the relationship between the seven-layer OSI reference model 100 and the IEEE 802.3 architectural layers for 1 Mb/s to 20 Mb/s operation model 110 and 100 Mb/s operation model 115 are shown.

100BASE-T is an IEEE standard 802.3 Physical Layer specification for 100 Mb/s Ethernet LANs. The standard extends the speed of the 802.3 Media Access Controller (MAC) to 100 Mb/s while utilizing the existing MAC service interface 102 of MAC 200. MAC service interface 102 is connected through a Reconciliation layer 103 and a Media Independent Interface layer 130 to a 100 Mb/s physical layer device sublayer 104. The physical layer may be implemented according to one of two additional physical layer specifications, 100BASE-T4 and 100BASE-X. 100BASE-T4 specifies the use of four pairs of category 3, 4 or 5 Unshielded Twisted Pair (UTP) wire. 100BASE-X supports two embodiments: 100BASE-TX and 100BASE-FX. 100BASE-TX specifies the use of 2 pairs of category 5 UTP or shielded twisted pair (STP) wire. 100BASE-FX specifies the use of 2 optical fibers. Generally, the term 100BASE-X is used when referring to characteristics common to both 100BASE-TX and 100BASE-FX.

100BASE-X is an IEEE standard 802.3 Physical Layer specification for 100 Mb/s LANs that uses the FDDI signaling standards. 100BASE-X encompasses 100BASE-TX (which references ANSI X3T9.5 TP-PMD/312, Revision 2.2, FDDI Twisted Pair Physical Medium Dependent (PMD) sublayer), and 100BASE-FX (which references ISO 9314-3, 1990, Fiber Distributed Data Interface (FDDI)—Part 3: Token Ring PMD sublayer).

As described in clause 28 of IEEE standard 802.3u, Auto-Negotiation is an optional function that allows a network device, such as a workstation, switch or repeater, coupled to a point-to-point link segment, to advertise the modes of operation of which it is capable to a network device at the other end of the point-to-point link segment and detect corresponding operational modes that the other network device may be advertising. Auto-Negotiation provides the capability for future technology upgrades and can be modified to advertise such modes of operation as types of physical layer devices available, full-duplex communication, and flow control. Auto-Negotiation further provides, through the use of the Parallel Detect Algorithm, the ability to detect and interoperate with legacy, non-Auto-Negotiation, half duplex, 10BASE-T, 100BASE-TX and 100BASE-T4 based nodes where applicable. Auto-Negotiation is designed for LANs implemented using unshielded twisted pair (UTP) copper wire and the well known, ISO/IEC 8802, eight-pin modular jack (RJ-45 connector). The signaling mechanism used in Auto-Negotiation is backwards compatible with the installed base of 10BASE-T baseband computer networks as defined in IEEE 802.3 Clause 14.

The 10BASE-T standard employs a discontinuous signaling method over the transmission medium. When data is not being sent over the copper wire, the voltage on the wire is zero, with the exception of an occasional Link Test Pulse. The Link Test Pulse, as defined in IEEE standard 802.3, Clause 14, signals that an active link connection exists. The Link Test Pulse is generally a 100 nanosecond positive pulse that repeats approximately every 16 milliseconds. Auto-Negotiation refers to the 10BASE-T Link Test Pulse as the Normal Link Pulse (NLP). Auto-Negotiation uses multiple Link Test Pulses to form a burst referred to as a Fat Link Pulse (FLP) Burst, as a signaling mechanism. Auto-Negotiation substitutes the FLP Burst in place of the single 10BASE-T Link Test Pulse. The FLP Burst encodes the data (identifying modes of operation) transmitted by the Auto-Negotiation function.

100BASE-T Architecture and Nomenclature

With reference to FIG. 1, the 100BASE-T standard extends the IEEE standard 802.3 Media Access Control (MAC) sublayer 200 to 100 Mb/s by coupling the MAC sublayer to a 100 Mb/s physical layer. The physical layer is comprised of additional sublayers including the Physical Coding Sublayer (PCS) 140, Physical Medium Attachment (PMA) sublayer 150, Physical Medium Dependent (PMD) sublayer 160 and, in a 100BASE-TX environment, an optional Auto-Negotiation (AutoNeg) sublayer 170. The PMD sublayer 160 encompasses the Medium Dependent Interface (MDI) 180. The MDI provides the medium attachment, including the connector, to the medium 190, such as UTP or STP wiring.

Reconciliation Sublayer

The Reconciliation Sublayer maintains the same interface to the MAC layer for 100 Mb/s operation as for 1 Mb/s to 20 Mb/s operation by reconciling the differences between the PLS, AUI, and MAU architectures described in IEEE 802.3 clauses 5 through 20 and the MII based architecture described in 802.3u.

Media Independent Interface (MII)

The MII sublayer provides, among other things, an interconnection between the MAC sublayer and Physical layer devices. As the name implies, this layer was designed to clearly separate the MAC sublayer from medium dependent issues. The MII is designed to support multiple physical layer devices operating at different speeds, e.g., 10 Mb/s or 100 Mb/s. The MII defines receive and transmit directions for data transfer, each comprised of a clock, error, enable and four data signals, for a total of fourteen signals. The MII can be embodied, for example, in an integrated circuit to integrated circuit interface with traces on a single printed circuit board (PCB), a motherboard to daughterboard interface across at least two PCBs, or a cable with appropriate connectors coupling two PCBs.

PCS Sublayer

Figure 3:
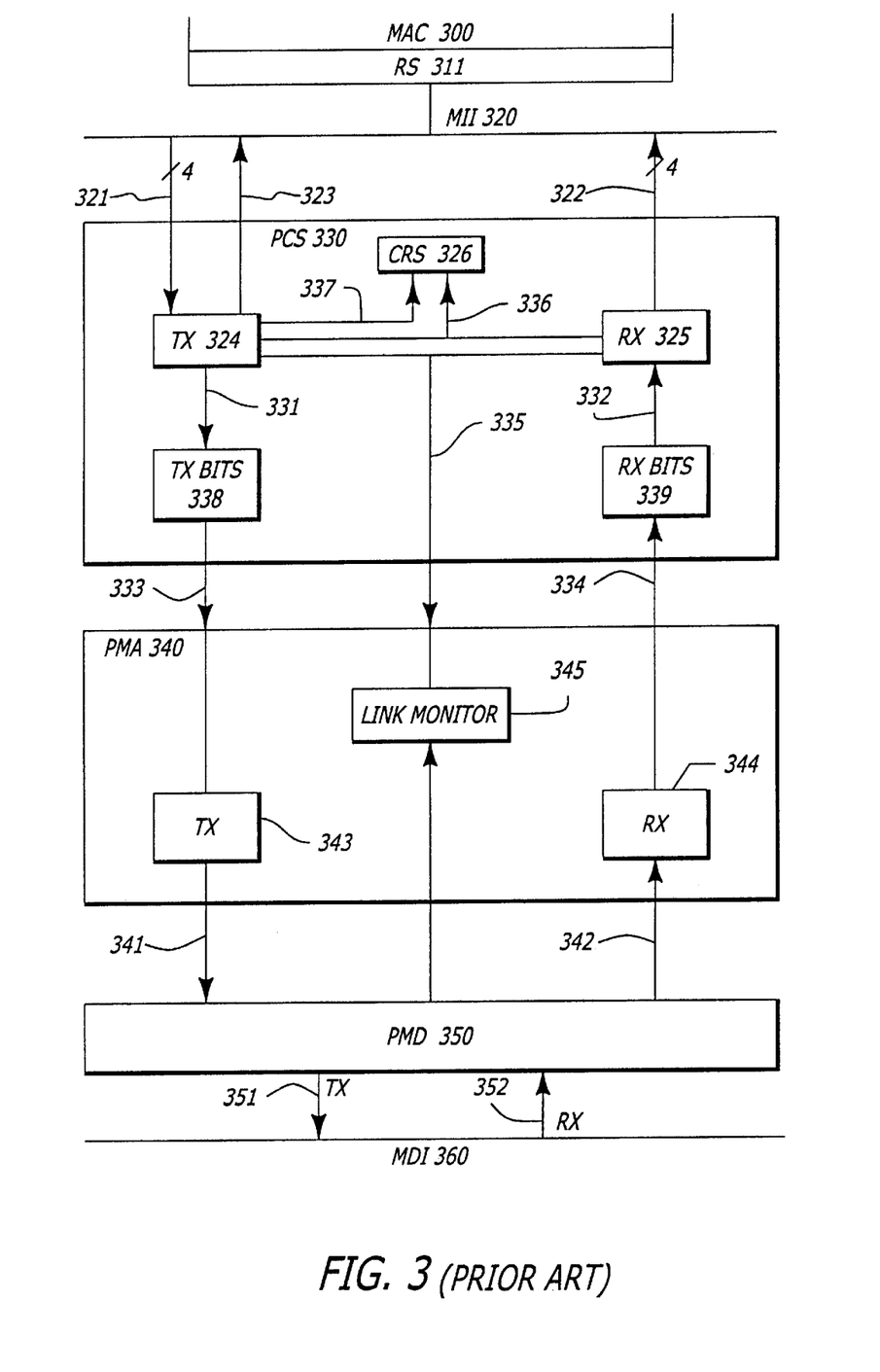
FIG. 3 illustrates the IEEE 802.3 architectural layers and service interfaces of the 10BASE-X standard.

With reference to FIG. 3, the PCS sublayer 330 provides a Media Independent Interface (MII) 320 to a Reconciliation sublayer 310 which, in turn, provides an interface between the MAC sublayer 300 and the Physical sublayers. The PCS sublayer transfers information with the MAC sublayer via asynchronous, nibble-wide (i.e., 4-bit wide) transmit and receive lines 321 and 322, respectively. The nibbles passed to the MAC sublayer are derived from code groups of 5 bits each (discussed below), which, in turn, are received from the medium via the PMA 340, PMD 350 and MDI 360. In a 100BASE-X environment, a PCS receive code bits process 339 accepts a continuous stream of 5-bit code groups at a rate of 25 million code groups per second (125 million bits per second). Each 5 bits that make up a code group is converted to a 4-bit value by a 4B5B decoder before being passed to the MAC sublayer 300 at a data rate of 25 million nibbles per second (100 million bits per second).

Likewise, a PCS transmit code bits process 338 transmits a continuous stream of code group bits generated by a 4B5B encoder based on bits received from the MAC sublayer via nibble-wide data line 321. Line 321 transmits data received from the MAC sublayer at a rate of 25 million nibbles per second, while transmit code bits process 338 transmits code group bits at a rate of 25 million code groups per second (125 million bits per second).

Code Groups

PCS 330 converts 4 bits received from RS 310 into 5-bit code groups via a 4B5B encoder. Likewise, a 4B5B decoder converts 5-bit code groups received from {MA} 340 into 4-bit nibbles. The IEEE Standard 802.3u defines a code group as a consecutive sequence of five code bits that are interpreted and mapped by the PCS. Code groups are defined in ISO 9314-1 (Fibre Distributed Data Interface (FDDI)— PHY, Table 1. Therein, a 4B5B data coding format is described in which a 4-bit nibble is mapped into a five bit code group. The nibbles of data, which represent hexadecimal digital words, are aligned to a 25 MHz clock. The resulting data rate of 100 Mb/s is converted by 4B5B encoding into a code bit rate of 125 Mb/s. Implementors may choose a 100 Mb/s/125 Mb/s serial implementation of the 4B5B encoding process, or a 4-bit wide to 5-bit wide parallel implementation of the 4B5B encoding process clocked at 25 MHz.

PCS Mapping of Data between MII and PMA

When receiving data from the PMA sublayer, the PCS 330 maps a nonaligned code-bit data line 334 from the PMA 340 to an aligned, 4-bit wide data line 322 across the MII 320. On transmitting data to the PMA, the PCS 330 maps an aligned, nibble-wide data line 321 across the MII to a nonaligned code-bit data line 333 to the PMA. Data bits are buffered on both transmission from and reception at the PCS by the transmit code bits process 338 and receive code bits process 339, respectively.

Upon receipt of a nibble from the MII 320, a 4B5B encoder in transmit process 324 of PCS 330 encodes the nibble into a 5-bit code group, according to the ISO 9314-1 FDDI PHY standard. Each 5-bit code group is buffered and transmitted to the PMA 340 as a serial string of five data bits by transmit code bits process 338. Likewise, upon receipt of a serial string of code group bits from PMA 340 over line 334, the receive code bits process 339 of PCS 330 buffers and deserializes 5-bit code groups before passing the code groups to a 4B5B decoder in receive process 325. The 4B5B decoder converts the code groups into nibbles and passes the nibbles on to MII 320, again according to the ISO 9314-1 FDDI PHY standard.

Carrier Detection and Data Transmission

PCS 330 sends 5-bit code groups to the PMA as described above. When not transmitting data packets, the PCS transmit code bits process 338 continually sources idle (I) code groups to the PMA. When the MII indicates to the PCS that data is ready to be transmitted, the transmit process 324 transmits a start of stream delimiter (SSD) (i.e., a J, K code group pair according to the above referenced FDDI PHY standard) to the PMA 340. Data received at the PCS sublayer from the MII 320 is then encoded into 5-bit code groups and transmitted to the PMA 340.

The receive code bits process 339 in the PCS sublayer receives code bits from the PMA 340. The receive bits are serially loaded into a 10-bit wide sliding window at a rate of 125 Mb/s. Most recently received code bits enter the sliding window at a location receive bit (RX BIT) 0 within the window. As each new bit is received, the existing bits in the window are shifted one position. When a code group of 5 bits is detected in the window, it is forwarded over line 332 to a 4B5B decoder in receive process 325, where the code group is converted to a nibble and passed to MII 320.

IEEE Architectural Model versus Implementation

IEEE 802.3 Physical Layer specifications provide an architectural model upon which to implement an interface device that couples a MAC layer interface to a physical medium operating at 1 Mb/s through 20 Mb/s or 100 Mb/s.

As discussed above, the architectural model focuses on a logical and functional division of services provided by each layer in the model and communication between the various layers comprising the functions. However, the actual implementation of a device (i.e., the electrical and mechanical components and their interconnection between the medium and MAC) in accordance with the IEEE 802.3 standard may substantially depart from the logical and functional divisions defined by the architectural model. It is understood by those of skill in the art that so long as the actual implementation adheres to the exact specification of the physical medium signals set forth in the Medium Dependent Interface (MDI) specification for 100 MB/s or the Medium Attachment Unit (MAU) specifications for 10BASE-T, the implementation need not exactly follow the logical and functional divisions defined in the architectural model. What is desired is an implementation of a physical layer interface device that provides efficient and economical configuration of integrated circuits and the like based on considerations of technology rather than considerations of logical functions so long as the implementation adheres to the exact specification of the physical medium signals and medium access operations set forth in the applicable medium to MAC/LLC specifications.

All commercial implementations of physical layer devices adhering to the IEEE 802.3u, 100BASE-TX standard utilize both analog circuit functions and digital circuit functions. These functions may be combined in a single device or split among multiple devices. If analog and digital functions are combined in a single device, mixed signal design methodologies are required in the engineering process. The establishment of engineering competency of mixed signal techniques is significantly more complex, expensive and risky than that for design of Application Specific Integrated Circuits (ASICs) utilizing digital cells in an "off the shelf" core. In the generic digital ASIC approach, standard cells, already placed in silicon, are connected together using custom metal layers to form the custom integrated circuit. Utilizing this established design methodology requires that the functionality of the ASIC be limited to only digital functions.

If the digital ASIC approach is to be used, the various analog functions such as clock recovery, waveshaping, and high speed digital operations (e.g., at 125 MHz) that are not compatible with low cost ASICs must be performed by one or more devices in the analog front end. This split between basic, low cost digital ASIC functionality and the other required physical layer device functions represents a service layer interface that splits the physical layer, which is based on commercial implementation and does not match any of the standardized architectural service layer interfaces. What is needed is a dual speed 10/100 Mb/s physical layer device service interface based on this commercial implementation.

Technological advances in analog circuitry presently do not keep pace with the significant technological advances in Complementary Metal Oxide Semiconductor (CMOS) Integrated Circuit (IC) technology. Advances in digital circuitry continue to produce smaller gates and die sizes, increase functionality and reduce costs. What is needed then, is a physical layer device whose implementation separates the digital integrated circuitry from the analog circuitry to take advantage of the improvements in digital ICs without affecting stable, analog circuitry.

It is further desirable for the analog front end of a 100BASE-TX only repeater to be able to support Auto-Negotiation Fast Link Pulse signaling without the requirement of supporting all the additional design issues of 10BASE-T functionality such as waveshape acceptance/rejection and a different clock speed. A desirable benefit of splitting the generation, receipt and clocking of the waveform on the medium from the process of data coding is the possibility of future line codes, without a change in analog physical layer device silicon, for applications such as Asynchronous Transfer Mode (ATM) to the desktop, or direct access to the Global Synchronous Digital Hierarchy (SDH) or LANs with error correction. An alternate data coding that used the 10BASE-T or 10BASE-X waveshapes would pass through the analog physical layer device for processing by a specialized digital ASIC.

Further, what is needed is an implementation of a physical layer device conforming to the IEEE 100BASE-TX standard that also provides 10BASE-T signaling to provide support for dual speed media access controller devices, e.g., a 10/100 Mb/s MAC device.

BRIEF SUMMARY OF THE INVENTION

An embodiment of the present invention provides a method and apparatus for transmitting IEEE 802.3 Standard 10BASE-T signals across a 100BASE-TX service interface in a physical layer device.

It is an object of the present invention to provide an implementation of a physical layer device that provides optimum configuration of integrated circuits and the like based on technology considerations rather than the logical functions defined by the architectural model set forth in the IEEE 802.3 100BASE-X standard.

It is a further object of the present invention to provide an implementation of a physical layer device conforming to the IEEE 100BASE-TX standard that allows 10BASE-T signaling across physical layer service interface to provide dual speed, 10/100 Mb/s, operation. The implementation also supports Auto-Negotiation Fast Link Pulse signaling in a 100BASE-TX repeater module.

It is an object of the present invention to split the processes of generation, receipt and clocking of a waveform on the medium, from the process of data coding, thus allowing the possibility of future line codes, without a change in analog physical layer device silicon, for applications such as ATM to the desktop, direct access to the Global Synchronous Digital Hierarchy (SDH) or LANs with error correction.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

Disclosed is a method and apparatus for transmitting IEEE 802.3 Standard 10BASE-T waveshape information across a physical layer service interface within a commercial implementation of a physical layer device adhering to the IEEE 802.3 Standard 100BASE-X. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

An embodiment of the present invention is optimized for use in a dual speed (10 Mb/s and 100 Mb/s) physical layer device. The embodiment provides a logical extension of an existing 100BASE-X physical layer service layer interface implementation to support 10BASE-T signaling across the interface and to allow dual speed operation.

Transmit Functions

According to an embodiment of the present invention, all necessary 10BASE-T signals to the medium are derived from a set of waveshapes which can be mapped across an existing 100BASE-X physical layer service interface. More specifically, with reference to FIGS. 2A–E and 4, the 10BASE-T signals are derived from a set of waveshapes transmitted between the digital ASIC 330 and the Analog Front End (AFE) 340.

10BASE-T signals are created in a 100BASE-X physical layer service interface implementation according to the present invention from a set of 50 nanosecond (ns) waveshapes to provide support for dual speed 10/100 Mb/s medium access controller devices. (A 10BASE-T medium operates at 10 MHz, so that 1 cycle, or 1 bit time equals 100 ns of time). The well-known Manchester encoding technique results in a 50 ns data cell with transitions occurring at a maximum of 20 MHz. The present invention utilizes a four data lines wide, Non Return to Zero (NRZ) interface implementation between the digital ASIC and analog front end (AFE) of a 100BASE-X physical layer service implementation to provide support for the 10BASE-T signals. The interface (10BASE-T mode) operates at 20 MHz and formats the 10BASE-T signals such that they can be sourced onto the twisted pair wire link with a minimum of additional processing.

Figure 4:
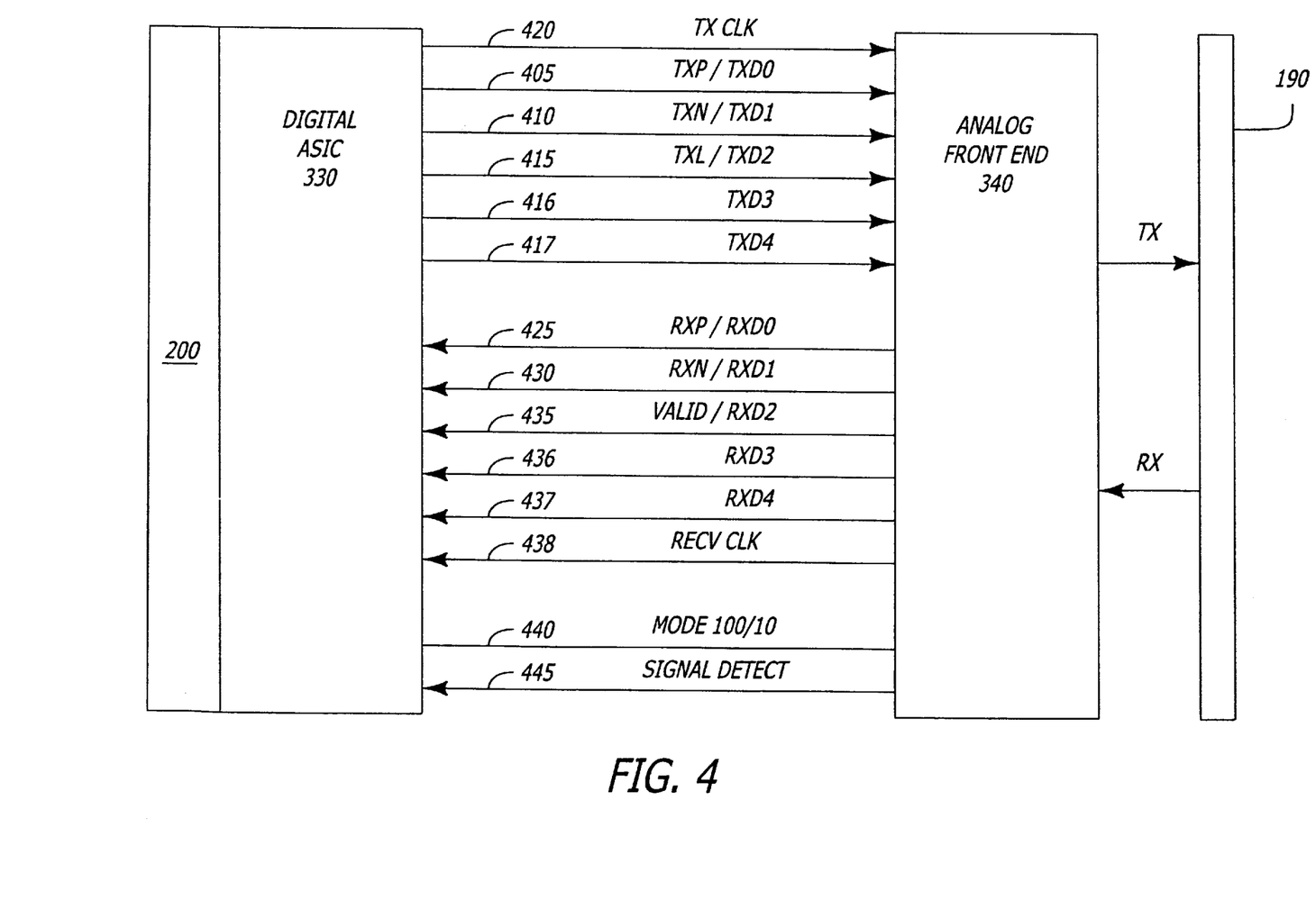
FIG. 4 illustrates the technology based implementation of a media access controller device as embodied by the present invention and conforming to IEEE 802.3 100BASE-X standard.

With reference to FIG. 4, the signals utilized by the interface to support 10BASE-T transmit signaling is shown according to an embodiment of the present invention. The interface couples digital ASIC 330 to AFE 340 via a number of transmit and receive data lines, and control lines. Depending on the desired data rate on the medium to which a physical layer device comprising the interface embodied by the present invention is connected, the lines support transmission of signals according to either the 10BASE-T or 100BASE-X standards.

Lines 405, 410, 415, 416, and 417 operate as 100BASE-X transmit data lines when circuitry 340 comprising the analog front end (AFE) side of the interface is connected to a medium operating at 100 Mb/s. Likewise, lines 425, 430, 435, 436 and 437 operate as 100BASE-X receive data lines when digital circuitry 340 is connected to a medium operating at 10 Mb/s. Transmit clock line 420 provides a 25 MHz clock for 100BASE-X functionality and a 20 MHz clock for 10BASE-T functionality. Recovered receive clock line 438 likewise provides a 25 or 20 MHz clock for 100BASE-X and 10BASE-T respectively.

In addition, a signal detect line 445 (from the TP-PMD clause 10.1.1 of the FDDI specification) is part of an existing implementation of a 100BASE-X service interface and indicates the presence of constant power on the line. This can be used as an indicator by the digital ASIC 330 to determine the data rate on the medium as 100BASE-X signals with continuous power. 10BASE-T uses discontinuous signaling and link test pulses and AutoNegotiation Fast Link Pulses (FLPs) to generate line transitions but not at sufficient power to trigger the signal detect line 445. It will be clear to those skilled in the art that there is sufficient information from data transition characteristics on the line and detection of power level for algorithms in the digital ASIC to make the proper determination of data rate on the medium. A default setting on the mode line 440 is for 10BASE-T operation in anticipation of receipt of AutoNegotiation FLPs. If the digital ASIC 330 detects the medium operating at 100 Mb/s, mode line 440 signals the AFE 340 to expect a 25 MHz clock and transmit and receive data according to the 100BASE-X standard. If the ASIC 330 detects the medium operating at 10 Mb/s, signal detect line 445 signals the AFE 340 to expect a 20 MHz clock and to transmit and receive data according to the 10BASE-T standard.

When a physical layer device comprising the interface embodied in the present invention is connected to a 10 Mb/s medium, 10BASE-T signaling is supported by at least a portion of the lines otherwise utilized for 100BASE-X signaling, referenced as transmit positive line 405, transmit negative line 410, transmit level line 415, and transmit clock line 420. The transmit positive and negative signals are either on/high or off/low. Likewise, the transmit level signal is a binary signal, either asserted/on or deasserted/off. The transmit clock signal is a 20 MHz square wave. Transmit data lines TXD3 (416) and TXD4 (417) are not used.

Figure 2A:
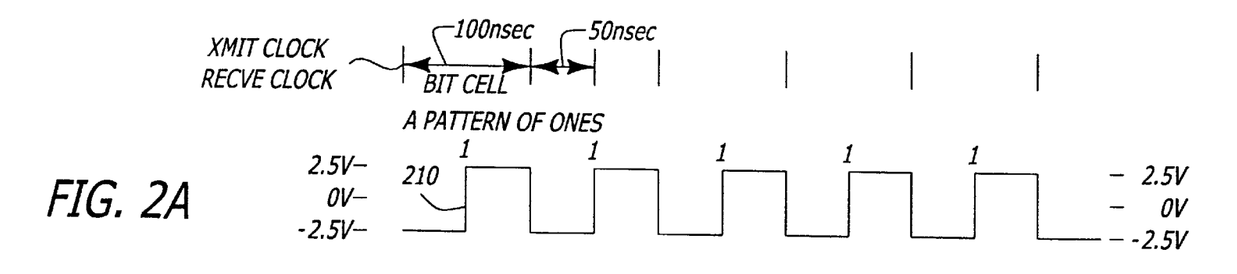
FIG. 2A illustrates the waveshapes for a continuous stream of ones according to 10BASE-T signaling transmitted across the 100BASE-X physical layer service interface implementation of the present invention.

With reference to FIG. 2A, given the Manchester encoding used in 10BASE-T signaling, a continuous stream of ones encodes into a 2.5 volt peak-to-peak, 10 MHz square wave 210 where the rising edge of the square wave is centered in the bit cell. This 2.5 volt peak-to-peak 10 MHz square wave is signaled across the lines comprising the digital to analog front end interface of the 100BASE-X physical layer service interface implementation of the present invention as follows:

Transmit Positive line 405: 0, 1, 0, 1, 0, 1, 0, 1, 0, 1, 0
Transmit Negative line 410: 1, 0, 1, 0, 1, 0, 1, 0, 1, 0, 1
Transmit Level line 415: 1, 1, 1, 1, 1, 1, 1, 1, 1, 1, 1

Figure 2B:
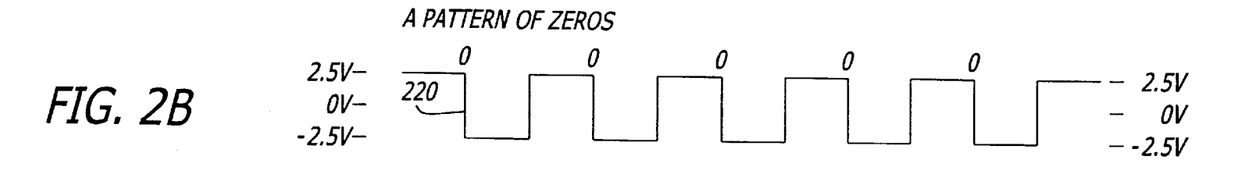
FIG. 2B illustrates the waveshapes for a continuous stream of zeros according to 10BASE-T signaling transmitted across the 100BASE-X physical layer service interface implementation of the present invention.

Likewise, in Manchester encoding, a continuous stream of zeros encodes into a 2.5 volt peak-to-peak, 10 MHz square wave 220 with the falling edge of the square wave centered in the bit cell. A stream of zeros is signaled across the interface of the present invention as follows:

Transmit Positive line 405: 1, 0, 1, 0, 1, 0, 1, 0, 1, 0, 1
Transmit Negative line 410: 0, 1, 0, 1, 0, 1, 0, 1, 0, 1, 0
Transmit Level line 415: 1, 1, 1, 1, 1, 1, 1, 1, 1, 1, 1

Since waveshape information is being transmitted across the interface, a continuous stream of zeros or a continuous stream of ones produces the same data sequence, as is appreciated by comparing the stream of continuous ones with the stream of continuous zeros. Both streams produce the same 2.5 volt peak-to-peak 10 MHz square wave to be transmitted over the communications medium by way of the AFE 340. The digital ASIC 330 is responsible for aligning the square waves to the bit cell boundaries, while the AFE 340 simply receive and pass on the signals transmitted thereto from the digital ASIC.

Figure 2C:
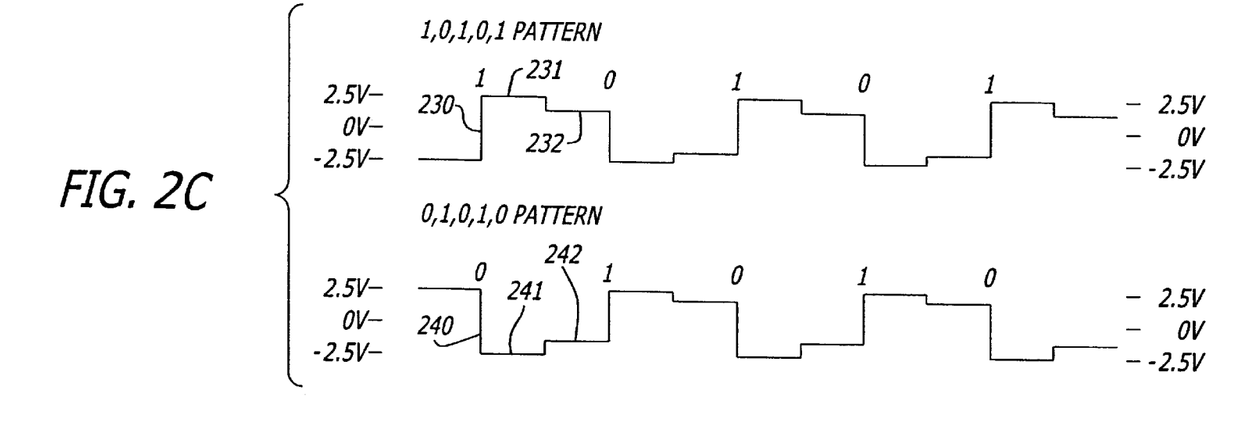
FIG. 2C illustrates the waveshapes for a continuous stream of alternating ones and zeros according to 10BASE-T signaling transmitted across the 100BASE-X physical layer service interface implementation of the present invention.

With reference to FIG. 2C, Manchester encoding of a 0, 1 or 1, 0 sequence yields a 5 MHz square wave. However, according to IEEE 802.3 specification, clause 14, predistortion is added to 5 MHz signal occurring in 10BASE-T to minimize jitter effects due to line charging. This predistorted waveshape is created according to the interface embodied by the present invention by transmitting at full transmit level (±2.5 volts) for one cycle (50 ns) followed by transmitting at something less than full transmit level, e.g., approximately 80% of full transmit level, for a second 50 ns cycle. The transmit level line 415 is used to determine whether a full level or predistortion level signal is to be transmitted on the transmit positive and transmit negative lines. When transmit level line is asserted, or on, transmit level is full, as indicated by the peak voltage associated with the transmission of either a one or a zero at bit cells 231 and 241, respectively, in FIG. 2C; when transmit level line is deasserted, or off, transmit level is at approximately 80%, as indicated by the less than peak voltages associated with the transmission of either a one or a zero at 232 and 242, respectively. Thus, a Manchester encoded stream of alternating 1, 0, 1, 0, 1 sequence is signaled across the interface as:

Transmit Positive line 405: 0, 1, 1, 0, 0, 1, 1, 0, 0, 1, 1
Transmit Negative line 410: 1, 0, 0, 1, 1, 0, 0, 1, 1, 0, 0
Transmit Level line 415: 1, 1, 0, 1, 0, 1, 0, 1, 0, 1, 0

This example assumes that a bit value of one was transmitted in the bit cell immediately preceding the sequence so predistortion of the signal was not required on the transmit negative line during the first bit cell illustrated. If a zero was transmitted in the preceding bit cell, predistortion of the signal would need to be applied and the transmit level line would be deasserted at the start of the sequence illustrated.

Figure 2D:
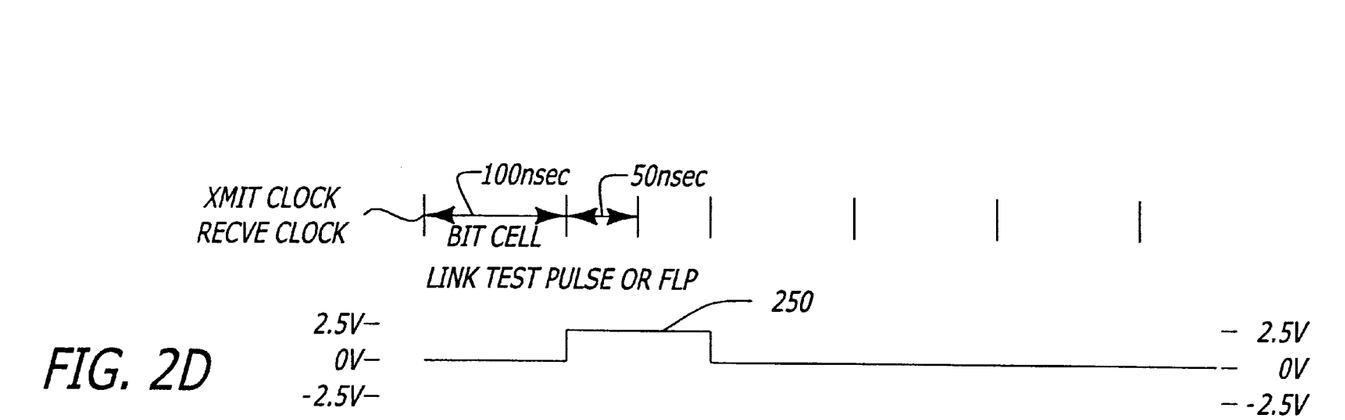
FIG. 2D illustrates the waveshapes for a Link Test Pulse signal according to 10BASE-T signaling transmitted across the 100BASE-X physical layer service interface implementation of the present invention.

A Link Test Pulse (LTP) signal is defined in the IEEE 802.3 specification at clause 14, section 3.1.2.1. Transmit limits with respect to the LTP signal is further illustrated in Figure 14-12 therein. With reference to FIG. 2D, according to one embodiment of the present invention, a waveshape representing the LTP signal is a 100 ns wide, positive going, 2.5 volt pulse 250. The transmit positive, negative and level lines of the interface represent a LTP signal according to the following sequence:

Transmit Positive line 405: 0, 0, 1, 1, 0, 0, 0, 0, 0, 0, 0
Transmit Negative line 410: 0, 0, 0, 0, 0, 0, 0, 0, 0, 0, 0
Transmit Level line 415: 1, 1, 1, 1, 1, 1, 1, 1, 1, 1, 1

Note that if both the transmit negative and transmit positive lines are at zero, the communication medium is in an idle state, or a transmission of zero volts (±50 mvolts).

Figure 2E:
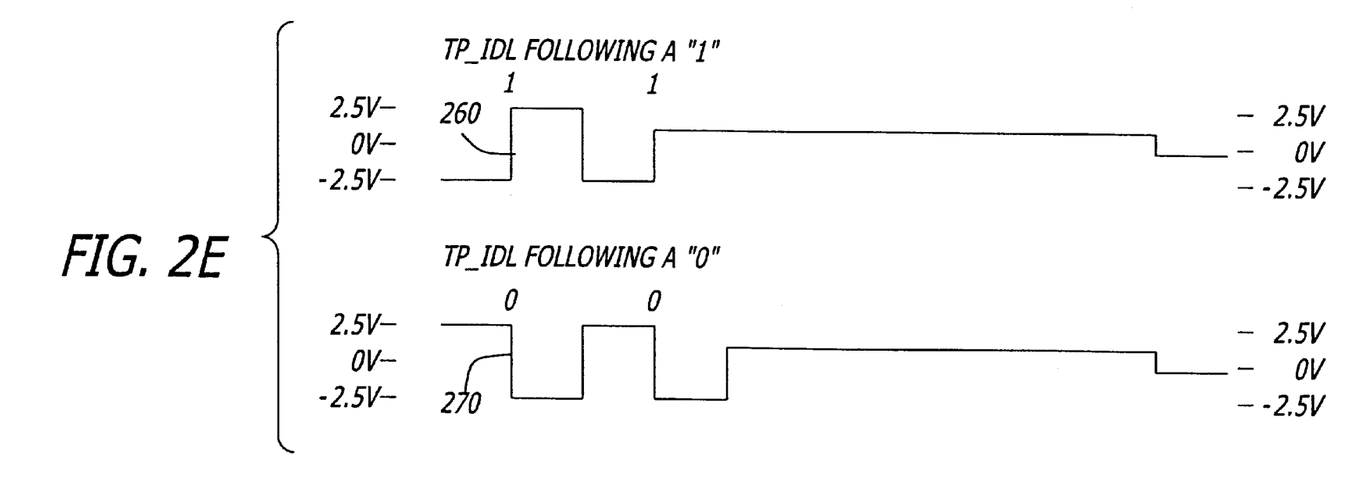
FIG. 2E illustrates the waveshapes for an idle signal according to 10BASE-T signaling transmitted across the 100BASE-X physical layer service interface implementation of the present invention.

The waveshape for a start of idle (TP_IDL) is defined in the IEEE 802.3 specification at clause 14, section 3.1.2.1. Transmit limits with respect to the TP_IDL signal is further illustrated in Figure 14-10 therein. With reference to FIG. 2E, according to one embodiment of the present invention, a waveshape representing the TP_IDL signal is referenced to the last rising edge of the signal. In other words, if the last bit before the start of the TL_IDL is a one, the last rising edge of the signal is in the center of the Manchester bit cell. If the last bit before the start of the TP_IDL signal is a zero, a rising edge at end of the Manchester bit cell is added. The signal transmitted across the interface of the present invention is as follows:

Transmit Positive line 405: 0, 1, 0, 1, 1, 1, 1, 1, 1, 1, 1
Transmit Negative line 410: 1, 0, 1, 0, 0, 0, 0, 0, 0, 0, 0
Transmit Level line 415: 1, 1, 1, 0, 0, 0, 0, 0, 0, 0, 0

The transmit level line can be asserted at the start of the TP_IDL signal and meets the requirements of IEEE 802.3, clause 14 and Figure 14-10 therein. However, the common practice in the industry is to use the pre-distortion level for TP_IDL as shown above.

In each of the above bit transmission patterns, the algorithm used to signal the waveform across the interface embodied by the present invention is implementation specific and left up to the implementor of the digital integrated circuitry of the physical layer service implementation. The details for the algorithm are left to one of ordinary skill in the art with an understanding of IEEE 802.3 clause 14.

In a 100BASE-TX-only repeater embodiment of the present invention, to support Auto-Negotiation, only the transmit positive and transmit negative lines are needed for Fast Link Pulse transmissions. The transmit level line is not required and information can be signaled using 25 MHz, 100BASE-X master clock without the need for synthesizing a 20 MHz 10BASE-T transmit clock, or including the complexity of a full 10BASE-T physical layer device. Using a 25 MHz clock, rather than a 20 MHz clock, causes shape information to be transmitted across the interface in 40 ns time increments. The IEEE 802.3 clause 14 template for a Link Test Pulse signal as illustrated in FIG. 14-12 therein allows a Link Test Pulse width of 1.3 bit times. A transmit positive signal sent for three 25 MHz clock cycles (1.2 bit times) also meets the timing criteria for Auto Negotiation Fast Link Pulses.

Receive Functions

Similar to the lines defined for transmitting 10BASE-T signals across the physical layer service implementation embodied by the present invention for a dual speed 10/100 Mb/s MAC device, there are 3 lines defined for receiving 10BASE-T signals from the AFE 340 and providing such signals to the digital ASIC 330: receive positive line 425, receive negative line 430 and the valid signal line 435. The receive positive and negative lines operate to carry binary signals, either on/high or off/flow. Likewise, the valid line is either asserted/yes or deasserted/no, and follows the dynamics for the signaling of valid data by IEEE 802.3 clause 14, 10BASE-T medium attachment unit (MAU).

While in the transmit direction there is a transmit clock, in the receive direction, a 20 MHz square wave is recovered from the received data signals. No synchronizers or phase locked loops are required on the digital ASIC side of the interface. The AFE 340 side deals with clock alignment and acceptance of valid levels. Data on the interface is synchronous with the receive clock associated with the analog circuitry. The receive clock is similar in dynamics of clock to that described in the MII specification in IEEE 802.3 clause 22. The clock is a continuous 20 MHz signal that slews into phase lock upon receipt of data. During idle, the receive clock locks to the transmit clock as a default. It should be noted that the receive clock is a continuous clock recovered from the data signals, as opposed to a clock that turns on and off, so that the digital ASIC 330 receive circuitry will always work and can sample, asynchronously, transitions due to AutoNegotiation FLPs or Link Test Pulses without the requirement of phase lock which is goods as there are only two transitions in a link pulse. It is then up to circuitry in the AFE 340 to determine valid 10BASE-T signal characteristics using the same design criteria as outlined in IEEE 802.3 Clause 14, 10BASE-T MAU specification. A 10BASE-T MAU passes a Manchester encoded waveform down the AUI cable (as opposed to a quiet line) in this service interface when the valid line is asserted. If a 100BASE-TX signal is received while in 10BASE-T mode, only a fraction of the waveshapes meet the 10BASE-T criteria for valid timing and level in the AFE 340. The result is an unstable valid line, a stable signal detect line, and a high density of Manchester code violations in the digital ASIC 330. This information causes the AFE 340 to switch over to 100BASE-TX mode via the mode line.

In 10BASE-T mode, RX+ and RX− are driven by simple level comparators in the AFE 340 based on activity on the medium. As a result, this asynchronous activity is always available to the digital ASIC. The valid line signals the digital ASIC that 10BASE-T waveshape criteria has been met and the receive clock slews to phase lock to the line activity which allows the digital ASIC to properly sample RX+ and RX− at the center of the cell. It is an architecture that is extremely simple and robust.

The receive positive line transmits the output of AFE 340 at a trigger level greater than +50 millivolts on the line. Note that a 10BASE-T idle signal is considered to be at zero ±50 millivolts in IEEE 802.3 clause 14. The receive negative line of the interface transmits the output of AFE 340 at a trigger level less than −50 millivolts on the line. The digital ASIC 330 side of the interface to determine if the line is at the right polarity and where the bit cell boundaries are, given the signals presented on the described receive lines.

If 10BASE-T signals are received while in 100BASE-X mode, line activity from the MLT-3 decoder will not match the dynamics of the signal detect line and high densities of illegal 4B5B symbols will be detected in the ASIC 330. The AFE 340 is then switched to 100BASE-TX operation via the mode line.

If 10BASE-T link pulses or AutoNegotiation FLPs are received while in 100BASE-X mode, small amounts of activity (two transitions and several milliseconds of dead line) on RX+ and RX− without any power indication on the signal detect line. The ASIC 330 would use this information to make the decision to signal the AFE 340 via the mode line to switch to 10BASE-T operation.

In a 100BASE-TX-only repeater embodiment of the present invention, to support Auto-Negotiation, only the receive positive and receive negative lines are needed for Fast Link Pulse reception. Receive positive and negative lines are asynchronous outputs sampled at the digital ASIC 330 side of the interface using the 100BASE-X, 25 MHz transmit clock. The sample time is sufficient to decode AutoNegotiation Fast Link Pulses. This approach for 100BASE-TX repeaters obviates the need for a 20 MHz clock synchronizer and significant 10BASE-T decoding and clock recovery circuitry at the digital ASIC side of the interface.

Although the present invention has been described in terms of specific exemplary embodiments, it will be appreciated that various modifications and alterations might be made by those skilled in the art without departing from the spirit and scope of the invention as set forth in the following claims.

What is claimed is:

1. An interface comprising:
a control line that transmits a control signal indicating a coding format for a plurality of binary signals;
a plurality of data lines that transmit the plurality of binary signals to an analog front end by a digital circuit in accordance with the coding format;
a clock line that transmits a clock signal to the analog front end at a frequency selected by the digital circuit; and
a signal detection line that transmits a first detection signal indicating a waveshape that meets 10BASE-T criteria for level and timing.

2. The interface of claim 1, further comprising a second detection signal indicating a continuous power signal received from a communication medium.

3. The interface of claim 1, wherein the digital circuit determines a data rate on the communications medium.

4. The interface of claim 1, wherein the coding format for the plurality of binary signals is one of a 10BASE-T coding format and a 100BASE-X coding format.

5. The interface of claim 4, wherein the 10BASE-T coding format specifies three of the plurality of data lines and the 100BASE-X coding format specifies five of the plurality of data lines.

6. The interface of claim 3, wherein the digital circuit uses information from the first signal detection signal, the second signal detection signal and a data activity to the data rate on the communications medium.

7. An interface for transmitting data between a digital circuit and an analog front end (AFE) according to one of two coding formats depending on a transmission characteristic of a communication medium, the interface comprising:
a control line providing the transmission characteristic of the communication medium to the digital circuit;
a transmit clock line providing a transmit clock signal indicating either a first clock rate or a second clock rate at which to transmit data from the digital circuit to the AFE depending on the transmission characteristic;
a plurality of transmit data lines for transmitting data at either the first or second clock rate and formatted according to either a first data format or a second data format from the digital circuit to the AFE depending on the transmission characteristic; and
a plurality of receive data lines for receiving data at either the first or second clock rate and formatted according to the first or second data format from the AFE to the digital circuit depending on the transmission characteristic.

8. An interface having a communications medium coupling an analog front end (AFE) to a digital circuit, the interface comprising:
a plurality of transmit data lines for transmitting data between the digital circuit and the AFE;
a transmit clock line for transmitting a transmit clock signal to the AFE indicating a transmit rate at which the digital circuit transmits data over the plurality of transmit data lines;
a plurality of receive data lines for receiving data at the digital circuit from the AFE;
a receive clock line for transmitting a receive clock signal to the digital circuit indicating a receive rate at which the AFE transmits data over the plurality of receive data lines; and
a signal detect line that transmits a signal detect signal from the AFE to the digital circuit when the AFE detects continuous power on the communications medium.

9. The apparatus of claim 8 further comprising a signal valid line which transmits a presence of waveshapes received that meet 10BASE-T level and timing criteria.

10. A method to transmit a plurality of binary signals from a digital circuit to an analog front end (AFE), the method comprising:
transmitting a control signal that indicates a coding format for the plurality of binary signals;
transmitting the plurality of binary signals in accordance with the coding format via a plurality of data lines;
transmitting a clock signal to the analog front end at a frequency selected by the digital circuit; and
transmitting a first detection signal that indicates a waveshape that meets 10BASE-T criteria for level and timing.

11. The method of claim 10, further comprising transmitting a second detection signal that indicates a continuous power signal.

12. The method of claim 11, further comprises determining a data rate on a communications medium by the digital circuit.

13. The method of claim 10, wherein the coding format for the plurality of binary signals is one of a 10BASE-T coding format and a 100BASE-X coding format.

14. The method of claim 13, wherein the 10BASE-T coding format comprises specifying three of the plurality of data lines.

15. The method of claim 13, wherein the 100BASE-X coding format comprises specifying five of the plurality of data lines.

16. A method for transmitting data between a digital circuit and an analog front end (AFE) according to one of the two coding formats, the method comprising:

providing a transmission characteristic of a communication medium to the digital circuit by a control line;

providing a transmit clock signal to indicate either a first clock rate or a second clock rate to transmit data from the digital circuit to the AFE by a transmit clock, the clock rate depends on the transmission characteristics; and transmitting a first signal detection signal and a second signal detection signal that indicates waveshapes that meets 10BASE-T criteria, the digital circuit uses information from the first signal detection signal and the second signal detection signal and a line activity when determining the data rate on the communication medium.

17. The method having a communication medium coupling a digital circuit and an analog front end (AFE), the method comprising:

transmitting data between the digital circuit and the AFE via a plurality of transmit data lines;

transmitting a transmit clock signal to the AFE via a transmit clock line;

indicating a transmitting data rate of the transmit data line by the transmit clock line;

receiving data at the digital circuit from the AFE via a plurality of receive data lines;

indicating a receiving data rate of the receive data line by the receive clock line; and transmitting a signal detect signal to the digital circuit via a signal detect line when AFE detects continuous power on the communication medium.

18. The method of claim 17 further comprising transmitting the presence of waveshapes received that meets 10BASE-T level and timing criteria via a signal valid line.

19. An apparatus to transmit a plurality of binary signals, the apparatus comprising:

means for transmitting a control signal that indicates a coding format for the plurality of binary signals;

means for transmitting the plurality of binary signals in accordance with the coding format via a plurality of data lines;

means for transmitting a clock signal to an analog front end (AFE) at a frequency via clock line; and means for transmitting a first detection signal that indicates a waveshape that meets 10BASE-T criteria for level and timing.

20. The apparatus of claim 19 further comprising means for transmitting a second detection signal that indicates a continuous power signal.

21. The apparatus of claim 20 wherein the mean for transmitting the control signal line is a digital circuit in communication with the AFE.

22. The apparatus of claim 20 wherein the transmitted clock signal indicating either a first clock rate or a second clock rate at which to transmit data from the mean for transmitting the plurality of binary signals depending on a transmission characteristic.

23. The apparatus of claim 22 wherein the plurality of data lines are transmit data lines.

24. The apparatus of claim 23 wherein the transmit data lines for transmitting data at either the first or second clock rate and formatted according to either a first data format or a second data format.

25. The apparatus of claim 22 wherein the plurality of data lines are receive data lines.

26. the apparatus of claim 25 wherein the receive data lines for receiving data at either the first or second clock rate and formatted according a first data format or a second data format.

27. The apparatus of claim 19 further comprises mean for determining a data rate on the plurality of binary signals.

28. The apparatus of claim 27 wherein mean for determining the data rate on the plurality of binary signals is the digital circuit.

* * * * *